March 20, 1956

R. G. DROIN 2,739,289

DEVICE FOR CONNECTING A ROTATORY PART
ELECTRICALLY TO A STATIONARY PART
Filed Jan. 13, 1953

INVENTOR
ROGER GABRIEL DROIN
BY *Fred M Vogel*

AGENT

United States Patent Office 2,739,289
Patented Mar. 20, 1956

2,739,289

DEVICE FOR CONNECTING A ROTATORY PART ELECTRICALLY TO A STATIONARY PART

Roger Gabriel Droin, Paris, France, assignor to Hartford National Bank and Trust Company, Hartford, Conn., as trustee Application January 13, 1953, Serial No. 331,080

Claims priority, application France January 18, 1952

2 Claims. (Cl. 339—2)

This invention relates to a device for connecting an electrical part, which is capable of rotation in two directions through a limited angle, by means of a plurality of connections without frictional contact, to a stationary part under the following conditions:

(a) The capacities of the connections relatively to one another and to earth should be very low;

(b) During rotation the capacity variations of the connections relatively to one another and to earth should be very small.

(c) The self-induction variations of the connections should be very small.

To this end the electrical connecting device, in accordance with the invention, comprises two supports, one of which is stationary, whereas the other is capable of rotation, spaced junction conductors which extend substantially parallel to each other and to the axis of rotation being connected at their ends to the said supports constantly tensioned by means of resilient members.

In one embodiment of the invention the supports are tubular and surround each other, the conductors, which are preferably equispaced, being housed in one of the supports and located around the axis thereof. Said conductors may at one end be secured to either one of the said supports and are at the other end acted upon by drawsprings fitted to the other support.

In order that the invention may readily be carried into effect, it will now be described in detail with reference to the accompanying drawing, given by way of example, in which Fig. 1 is an axial section of the device according to the invention.

The electrical part capable of rotation and the stationary electrical part (not represented) to be interconnected are fitted to a tubular support A and to a tubular base B respectively.

The tube A carries at the top an insulating plate P through which pass junction conductors F (in the present example three) and to which are secured junction members D for connecting the movable electrical part.

The junction conductors extending parallel to the axis of tube A are flexible, each of them being tensioned by means of springs V provided in cavities L of the stationary base B. Each cavity is connected through a small aperture O with the interior of tube A. At one end each spring rests on the bottom of its cavity and at the other end on a shoulder T which is rigidly secured to the junction conductor F and freely movable in the cavity L.

The base B is secured to a mounting plate M by means of screws N.

The tube A is adapted to be driven by a pulley C or any other suitable member.

The proportions of the parts and the arrangement of the conductors as well as the apertures of plate P and the arrangement of the springs on base B are such that upon rotation the spacing between the wires is constantly sufficient to prevent short-circuits and to minimize capacity variations.

The conductors are advantageously provided about the axis of rotation and equispaced from each other in a manner such as to extend parallel to the axis in the angular centre position of the rotatory part. This is achieved by providing that the apertures of plate P extend in line with the apertures L in said position. The conductors remain parallel to each other but slightly approach the axis if the rotatory part moves in one direction or in the other.

Figure 3:
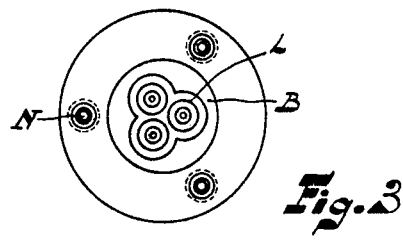
Figs. 2 and 3 are end views.
Figure 4:
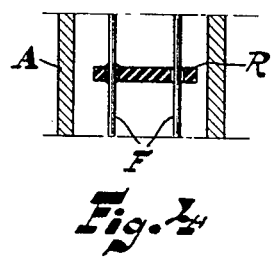
Figs. 4 and 5 show the arrangement of disc-shaped spacing members.
Figure 1:
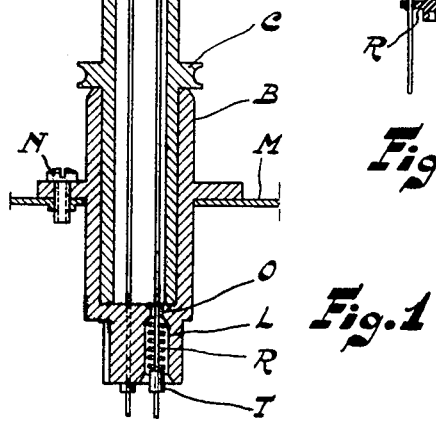
Figure 5:
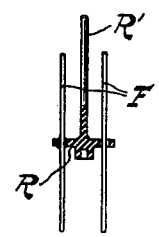
Figure 2:
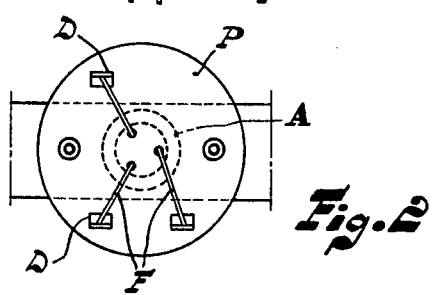

If the angle of rotation of tube A is large the latter may contain insulating discs R (Figs. 4 and 5) which are freely rotatable and rigidly secured to either one of the conductors F. Said discs serve to space the conductors from each other and may be provided with a central rod R' (Fig. 5) preventing the conductors from touching each other.

The junction device as described may, for example, be employed for a rotatory frame antenna for radio receivers.

What I claim is:

1. An electrical junction device comprising a pair of interfitting tubular supports, one of which is rotatable, a plurality of connecting wires in said inner support extending substantially parallel to the axis of rotation of said rotatable support, a sleeve-like shoulder secured to each of said wires, said outer support being provided with at least one aperture, said wires being connected to at least one of said supports, and a spring in each of said apertures having one end thereof abutting said sleeve-like shoulder and the other end thereof engaging a part of said outer support for constantly tensioning each of said wires.

2. An electrical junction device comprising a pair of interfitting tubular supports, one of which is rotatable, a plurality of connecting wires in the inner support extending substantially parallel to the axis of rotation of said rotatable support, a sleeve-like shoulder secured to each of said wires, one of said supports being provided with at least one aperture, said wires being connected to at least one of said supports, and a spring in each of said apertures having one end thereof abutting said sleeve-like shoulder and the other end thereof engaging a part of said outer support for constantly tensioning each of said wires.

References Cited in the file of this patent

UNITED STATES PATENTS

| | | |
|---|---|---|
| 1,759,567 | Dibner | May 20, 1930 |
| 2,562,979 | Yingling | Aug. 7, 1951 |
| 2,689,944 | Curtis | Sept. 21, 1954 |